Patented Mar. 30, 1926.

1,578,812

UNITED STATES PATENT OFFICE.

CHESTER L. DAWES AND WILLIS A. BOUGHTON, OF CAMBRIDGE, MASSACHUSETTS, ASSIGNORS TO NEW ENGLAND MICA COMPANY, OF WALTHAM, MASSACHUSETTS, A CORPORATION OF MASSACHUSETTS.

INSULATING BODIES AND METHOD OF PRODUCING THEM.

No Drawing.   Application filed October 26, 1922.   Serial No. 597,153.

*To all whom it may concern:*

Be it known that we, CHESTER L. DAWES and WILLIS A. BOUGHTON, citizens of the United States of America, and residents of Cambridge, in the county of Middlesex and State of Massachusetts, have invented new and useful Improvements in Insulating Bodies and Methods of Producing Them, of which the following is a specification.

Our invention relates to the manufacture of insulating materials, particularly to plates or other bodies comprising mica flakes integrated by means of an adhesive binder, and the object of the invention is, to produce such composite insulators as will withstand temperatures up to the disintegration point of mica, retain their structural integrity, and mechanical strength, provide high electrical resistance and dielectric strength at the high temperatures at which the product is designed to be used, and be substantially non-hygroscopic.

The mica-flake plates, which represent insulators of the general character referred to and which have for some time been in use, have for the greater part been composed of mica flakes bound together with an organic adhesive, such as shellac; such binding materials, while serving practical purposes admirably at moderate temperatures, are unable to withstand temperatures that are somewhat higher, but still far below the disintegration temperature of mica. Mica-flake plates made with sodium silicate solution have also been produced, and used to a substantial extent, but sodium silicate, in such mica plates, has proved defective because of its large content of water, which at temperatures above the boiling point of water, generates steam which causes the composite plate to intumesce and physically disintegrate, while losing its insulating efficiency somewhat, by reason of the liberation of steam and recondensation as water.

Boron trioxide and lead borate have been proposed as inorganic adhesive binders for mica-flake plate; but both these substances are unsuited to conditions which require an insulating plate which will preserve its integrity and practical utility at temperatures approaching that at which mica disintegrates; the boron trioxide because of its high fluidity when fused; the lead borate because of the formation therein of reduced lead. By research into the behavior of mica-flake plates integrated by inorganic adhesive binding materials, we arrived at the conclusion that to obtain maximum efficiency, (that is to say, the sum of desirable properties equal to that of natural high grade mica) there must be provided an inorganic binder of such high viscosity at the disintegration temperature of mica (for example 700°–750° C. in the case of the kind of mica we had under observation) and ordinary pressures as to be practically a solid, and which should also be non-volatile, non-corrodible, non-corrosive, permanent in composition in the presence of oxygen, and stable in composition at all working temperatures. This conclusion presented the problem of reconciling the stated physical and chemical characteristics of the inorganic binder with the requirement that it shall be sufficiently fluid, at temperatures lower than the disintegration point of mica, to permit it to flow and extend itself in tenuous films between the mica flakes. In one aspect, the means of obtaining the reconciliation between the physical requirements for manufacture, on the one hand, and for efficiency in use, on the other, constitutes or characterizes the invention herein described.

With inconsiderable exceptions, the liquefying temperature of fusible or liquefiable substances becomes less with increase in pressure, provided the pressure in not hydrostatic (i. e., equal in all directions); some substances which are infusible, in that under heat they decompose without melting at ordinary atmospheric pressure, fuse or flow if subjected to pressure as well as heat. The characteristic of fusing or flowing at a lower temperature under high pressure than at ordinary pressure is common to many substances which possess properties that fit them for use as inorganic adhesives, so that, by selecting substances either as single chemical compounds or as more or less composite mixtures of chemical compounds which under ordinary pressures and at temperatures near to the desintegration point of mica are practically solids or very viscous liquids, while fusible or liquefiable at or about those same temperatures provided unusual pressures are imposed upon them, it is possible to obtain a mica-flake plate integrated by means of a binder practically solid, and infusible under ordinary pressures, at all temperatures up to the disintegration point of mica. It should be understood that the quality of an adhesive shall characterize the substance which is formed by fusion in association with mica flakes. Within the indicated requirements, binding material will be selected with a view to practical manufacturing conditions, particularly in respect to the pressure required to reduce the fusion or flowing temperature to a degree consistent with preservation of mica flakes; those substances which are workable under pressures within such practicable range being obviously to be preferred, provided they possess the qualities indicated.

In order to make it clear that we are using the term "fusion" in a broadly inclusive sense, as meaning liquefaction we cite the fact that the liquefaction of certain water-soluble substances, such as the silicates of the alkali metals is subject to the same variation of liquefying temperature under the influence of changing pressure, as the fusion of substances which are not in solution. By applying pressure, a silicate (especially one having a high silica content in its composition) with comparatively little water in association, can be made to flow freely at temperatures lower than that at which fusion, strictly speaking, of the silicate molecule takes place. Actual fusion of such a substance involves the expulsion of all water previously retained in association, and requires a very elevated temperature. Such substances as alkali silicates containing still some water semi-chemically combined can be made to flow, however, without complete removal of residual water, at lower temperatures, provided the correct relation between pressure and temperature be obtained and imposed.

In general, it may be said that we take advantage of the fact that temperature and pressure are to a limited but definite extent interchangeable factors in affecting either the true melting point or the practically equivalent flowing point, of a wide range of substances, many of which liquefy by true fusion, others liquefying by reduction of viscosity while remaining essentially in a state of solution or suspension, a state consistent with virtual solidity under ordinary temperatures and pressures.

For example:

I. Silicates of the alkali metals.

These substances are susceptible of treatment either by true fusion, involving removal of all water of association, or by liquefaction with retention of water of solution or colloidal association. Practically, the latter mode of manipulation is the one to select for these materials, since true fusion calls for temperatures far beyond the decomposition point of mica, except under pressures so high as to be impracticable for commercial purposes. The simplest constitution of such silicates (represented by $Na_2SiO_3$) is seldom realized; the $Na_2O$ and $SiO_2$ factors vary widely, and we have found that the silicates of the alkali metals in which the silica factor is high (as for instance a 3 to 1 or 4 to 1 ratio between $SiO_2$ and $Na_2O$) serve better for purposes of binding mica-flakes than those in which the ratio is lower in $SiO_2$. If mica flakes and a high-silica alkali-metal silicate be assembled in a suitable press (the silicate either in a flowing solution or practically solid at ordinary temperature and pressure, although containing a variable amount of water, and pulverized) and be raised to a temperature, say of 650° to 700° C. and there maintained until only so much water remains in association as is consistent with the temperature condition, and if pressure be applied to the assembled materials while maintaining the said temperature, and be increased, a pressure-factor which depends on the temperature actually maintained will presently be developed which represents the flowing pressure for the given temperature and the silicate will liquefy and flow, spreading between and over the mica flakes while the whole mass of material becomes condensed by expression of surplus binding silicate if the original quantity was in excess of that required to cover the mica-flakes with thin adhesive films. On release of pressure or subsidence of temperature, or both, the binder solidifies, and a mica-flake plate results which will thereafter retain its integrity in use under any temperatures short of that at which mica itself disintegrates.

Mica-flake plates, comprising silicate binders as previously used which, while analogous in composition to those high-silica compounds which require the application of pressure in order to flow at temperatures below the disintegration point of mica, are nevertheless relatively low in silica (by ratio) and capable of flowing at atmospheric pressure at similarly safe temperatures, will be found practically useful in many situations although incapable of retaining practically solid integrity at temperatures approaching that of mica disintegration. In treating the materials for mica-plate manufacture, comprising silicate binders of all the varying characteristics mentioned, these will advantageously be subjected to heat for a period sufficiently long to allow all except a small residue of water-content to escape, and then be subjected to pressure which, in all cases, serves to give its desired ultimate form and proportions to the mica-flake plate and to distribute the binding material over the surfaces of the flakes themselves, and which, in those instances which require pressure to produce a state of flux, serves to render fluid the binding material which otherwise would remain in a nearly, or practically, solid condition. The temperature applied should, in all cases, be substantially higher than that at which water boils; the generation of steam in the silicate binder often causes it to puff up; but if the steam representing the water is gradually liberated, there will be left only a small residue of water, which is not only harmless under conditions of subsequent use of the mica-flake plate, but also functions usefully in promoting the flow of the binder which is colloidally or chemically associated with it.

Alkali-metal silicates may be employed either as solutions, or in practically solid and comminuted condition, in the preliminary stages of manufacture of mica-flake plates, or they may be formed in the assemblage of materials by interspersing between the flakes two or more substances which under the conditions of heat, or heat and pressure, react to form the silicate which is ultimately to constitute the binder. For instance, a suspension of silica ($SiO_2$) in a solution of alkali hydroxide or carbonate, used as material for preliminary cementation of mica flakes, dried and heated under pressure will produce a silicate binder. The degree of pressure required to effect flow of the binder-silicate at a safe temperature will depend largely on the silica ratio in the mixture and reaction. A typical illustration of the reaction is:

$$2NaOH + SiO_2 = Na_2SiO_3 + H_2O.$$

The synthetic production of alkali-silicate suitable for a mica binder may be effected by heating and compressing admixed alakli salts of suitable nature with silica, by processes very similar to those used in commerce for manufacturing the alkali silicates.

*Composite alkali-metal silicates.*—Mica-flake plates of excellent qualities, such as high electrical resistance, high dielectric strength, non-hygroscopicity, mechanical strength when cold, resistance to atmospheric conditions, comparative freedom from corrosion or corrosiveness, and relative chemical stability under repeated temperature-fluctuations, are producible by the employment of composite silicates. A mixture of sodium and potassium silicates, employed as a binder and manipulated in the manner above described with respect to simple silicates, yields these results. Such a mixture may with advantage be produced synthetically by mixing pure potassium hydroxide, or carbonate, with a sodium silicate solution, the metathetical reaction which takes place when the mixture is treated by heat, or heat with pressure, is typically represented by:

$$Na_2SiO_3 + 2KOH = 2NaOH + K_2SiO_3,$$

it being understood that the original quantity of sodium silicate is in excess, so that there remains after reaction a desired ratio of sodium silicate and potassium silicate, with free caustic soda. The latter, however, will of course react with the excess silica in the original silicate to produce an alkali silicate of somewhat lower silica-alkali ratio.

*II. Phosphates of the alkali metals.*

Sodium metaphosphate, in its simplest form is represented by the formula $NaPO_3$; it is known, however, to exist in polymeric forms $(NaPO_3)_2$; $NaPO_3)_3$, etc. As ordinarily made, it becomes viscously fluid at about 600° C. Its solubility in water enables it to be used in solution to build up an assemblage of mica-flakes, the solution being quite sticky and therefore well adapted to the formation of the laminated mass, which is to be finally integrated. After the preliminary heating to eliminate the water, the composite is raised to a temperature below but not far from 700°–750° C., and then pressure is applied, which has the effect of increasing the fluidity of the viscous metaphosphate, while it operates to distribute the metaphosphate between and over the mica-flakes. Mica-flake plates made with a metaphosphate binder have a markedly homogeneous structure and excellent mechanical and moderately-good electrical properties. Metaphosphates of the other alkali metals are similarly qualified to serve as mica-flake binders.

Although an excellent binder, either alone, or in composition with other salts, sodium metaphosphate is expensive and rather difficult to make. Materials from which the sodium metaphosphates can be made, such as monosodium phosphate, or sodium ammonium hydrogen phosphate (microcosmic salt) are common and relatively cheap. These compounds are, however, in themselves unsuitable for mica-flake binders. But if an assemblage of mica flakes be built up and properly interspersed with either a solution or a powder of such substances, dried if necessary, and heated under control of both temperature and pressure, the metaphosphate is formed during the manufacture of the mica-flake plate itself. The salt first liquefies (in its water of crystallization if any be present) forming a mobile fluid which spreads into the interstices between the mica flakes. As the temperature is raised, the volatile constituents (water, ammonia, etc.) are driven off and at very low red heat the mass hardens. By then applying pressure, (which in the case of the sodium salts needs only to be such as to define the intended surface of the product) and elevating the temperature nearly to the decomposition point of mica, the binding material reliquefies forming the metaphosphate, cementing the mica flakes together, possibly with some chemical action on the mica itself. When cooled, a mica flake plate thus formed has most of the properties demanded of a high-heat resisting and high insulating plate.

Other alkali-metal phosphates, such as represented by disodium monohydrogen orthophosphate, trisodium orthophosphate, sodium pyrophosphate (and analogous potassium, etc., salts) are also available, and serve as mica-flake binders when subjected to heat and pressure in the same manner (generally speaking) as that described in connection with the metaphosphates, provided that when employing such phosphates, there be used in mixture one or more easily fusible salts of the alkali metals or alkaline-earth metals, e. g., a nitrate, sulfate, carbonate, etc., or an acid such as phosphoric acid or an acid salt such as potassium acid sulfate (KHSO$_4$), to produce a composite material which becomes fluid at lower temperature (or pressure) than the phosphate salt alone, or to use such other phosphates in mixture with the more readily fusible metaphosphates.

There remain to be mentioned and briefly discussed certain other substances, adapted to serve as inorganic heat resisting binders for mica flake plates, either alone or in conjunction with other materials. Borates of the alkali metals (e. g. sodium tetraborate, ammonium borate) are, like the alkali-metal phosphates above mentioned, effective in mixture with metaphosphate. A mixture of sodium metaphosphate with sodium tetraborate forms with mica flake a plate highly satisfactory with respect to electrical resistance and dielectric strength at high temperatures, mechanical strength, non-hygroscopicity, non-corrodibility, non-corrosiveness, and substantial permanence under continuous use.

Other alkali metal phosphates, e. g., disodium monohydrogen orthophosphate, trisodium orthophosphate, sodium pyrophosphate (and analogous potassium, etc., salts) may advantageously be used in mixture with sodium metaphosphate (or its analogous potassium metaphosphate) to produce a binder for mica fragments which becomes fluid at lower temperature (or pressure) than the said other phosphates were they to be used without the metaphosphates.

Relatively small quantities of salts of the alkali-metals or alkaline-earth metals, such as halogen salts, nitrates, sulfates, carbonates, oxides, arsenates, etc., which are comparatively infusible or non-liquefiable when alone, may be mixed with any of the binding materials, represented by the liquefiable salts of the alkali or alkaline-earth bases (which are characterized by liquefiability or reduced viscosity under various conditions of temperature and pressure), these fundamental binders being used either singly or in combination.

Mixtures of small quantities of the above mentioned salts with an alkali-metal metaphosphate will produce compound binding materials of practically any desired liquefiability (with a view to temperatures and pressures employed), since the relatively infusible or heat-refractory substances which are fluxed by the more easily liquefiable metaphosphate may have excellent properties of electrical resistance, dielectric strength, mechanical strength, and non-hygroscopicity, and are thus adapted to the requirements of insulating bodies. Thus, alkali-metal silicates, borates, or phosphates singly or in combination, mixed with the relatively higher melting other salts of the alkali or alkaline-earth metals, yield composite binders of practically any desired liquefiability (with a view to temperatures and pressures employed); these mixtures with relatively higher-melting substances have excellent properties of electrical resistance and dielectric strength, and are thus adapted to the requirements of insulating plates or other shapes or bodies, and since, also, they react with, or become dissolved or suspended in, the predominant binder material when the application of heat and pressure produces liquefaction.

In any case, whether a simple or composite binder is added, the manipulation will depend upon the condition in which the material is applied. If in solution or suspension, preliminary drying of the composite assemblage of mica flakes and binding material will in most cases be resorted to. This is ordinarily done at relatively low temperatures and with pressures only sufficient to cause the flakes to adhere to one another and thus form a plate that holds together and can be handled. After this preliminary drying, the plate is subjected to high pressure and temperature. The maximum limit of temperature is imposed by the mica itself, which must not be exposed to a disintegration temperature; the pressure required to produce the requisite liquefaction of the binding material will vary according to the liquefaction temperature of the binder at ordinary atmospheric pressure. Tentatively, and without more confidence in their universal applicability than seems justified by the observations and data so far made and accumulated by our researches, we suggest the following as guides to the selection and manipulation of mica-flake binding materials.

With mica, such as we have employed, characterized by a disintegration temperature in the neighborhood of 700° to 750° C., if a binding material, at atmospheric pressure, melts or liquefies at a temperature not higher than 800° C., it may be used alone, and be made to flow under pressures not difficult to apply in manufacturing practice. With unusually powerful pressure apparatus, which may possibly be designed, this suggested practical limit of refractoriness to heat may be raised, thus if a binder-substance requires, at atmospheric pressure, a temperature much in excess of 750° C., where such mica disintegrates, correspondingly higher pressure must be applied to make the binding material flow at safe temperatures below 750° C.

If substances are used, as ingredients in a composite binding material, which themselves are comparatively or actually non-liquefiable or infusible, they should be mixed with some inorganic salt with which (in solution or liquefaction analogous to fusion) they will react or dissolve to produce a resultant material which will flow under pressure, at temperatures consistent with the presence of mica. Water-insoluble salts may be used either dry and comminuted, or in suspension in water, or in a solution of or suspension in a soluble binder.

Bearing in mind that with some substances the temperature of liquefaction or flow becomes lower with increase of pressure, while with other substances, infusible at ordinary pressures at a given temperature, liquefaction or flow can be produced when sufficient pressure is applied, it may safely be stated; that to make a thoroughly satisfactory high-temperature mica-flake plate one should select an inorganic binder which is effectively adhesive, or becomes so at an available temperature (which is safe for mica), which, at ordinary pressures and at the temperature at which the plate is to be used, does not flow, at all events not enough to allow the plate to deform, decompose, or break up, under such use; that one should apply that binder in a distributed condition to the mica flakes; that one should raise the temperature as closely to the decomposition point of mica as is safe, to effect intended and desired chemical or physical changes or both; that one should then, or earlier, apply sufficient pressure to make the binder flow, fill the interstices, and adhere closely to the mica surfaces; that one should thereupon while maintaining the applied pressure, lower the temperature to a point where, in spite of the pressure, the binder is in practically a solid state; that one should then relax the pressure and allow the plate to cool.

Examples, which we have found to yield practicable binders for high heat mica flake plates, representing several of the groups of composite binders hereinabove discussed, are as follows:

Sodium silicate solution (highly viscous), 72 cc.; dry sodium carbonate, 2 g.; dry potassium carbonate, 2 g.; fused potassium hydroxide, 1.5 g.; water, 50 cc.

Sodium silicate, 72 cc.; potassium carbonate 2.2 g.; potassium nitrate, 2. g.; magnesium oxide, 4. g.; water, 50 cc.

Sodium tetraborate (borax), 25 g.; potassium carbonate, 5 g.; calcium oxide, 5 g.; water, 100 cc.

Sodium metaphosphate, 12 g.; sodium carbonate, 2 g.; calcium oxide, 2 g.; water, 38 cc.

Monobasic sodium phosphate, 3 g.; crystallized borax, 6 g.; water, 22 cc.

We have made the foregoing thesis in extension over many materials in order to clarify the basis upon which we now venture to generalize. It will be observed that all the materials which have been pointed out as available for use either singly, as simple binders, or as the fundamental and predominant binder material in composite binders which comprise also materials unsuited themselves to function as binding material, are salts of the alkali metals which manifest one of the characteristics of glasses, in that, instead of being translated abruptly from a solid to a liquid condition at a fairly well defined critical temperature, they pass through progressive stages of decreasing viscosity over a substantial range of temperature. This does not necessarily imply that substances which may be defined as glass-like because of this characteristic are strictly amorphous, or belong in the category of subcooled liquids, as is the case with a true glass. Many salts which when cooled and solidified from the liquid state manifest none of the outward or superficial characteristics of the crystalline, but nevertheless when etched or under the test of X-ray spectra show that their molecular structure is orderly, and that they are crystals and not true amorphous glasses.

Therefore, we feel justified in applying the term glass-like to such alkali-metal and other salts which are characterized for one reason or another, such as combination with persistently retained water, by an observable gradation of viscosity or fluidity through a range of temperature which excludes the determination of any one temperature or limited temperature change as a critical temperature of liquefaction.

We believe that the efficacy of alkali-metal or alkaline-earth-metal salts which manifest glass-like characteristics (whether or not true glasses or subcooled liquids) in association with mica flake either as simple binders, or as fundamental binding materials in mixtures, as due to superficial molecular reaction with mica, a reaction which may be in some cases no more than at association between solid and liquid which is manifested by the "wetting" of the solid with the liquid, a predominance of the adhesive mutuality of the molecules of the liquid and the solid, respectively, over the surface-tension possessed by the liquid factor. The circumstance that mica is in the main a silicate of the alkali, alkaline-earth metals, aluminum, etc., coupled with the fact that alkali-metal and alkaline-earth-metal salts manifest a very general tendency to form complex compounds, throws some light on the behavior of the alkali-metal salts when used either by themselves or in composition with other salts having similar bases, in association with mica flakes.

In the foregoing specification, mica-flake plates have been taken as an example of the insulating bodies, the production of which is the object of our invention; mica-flakes, however, should for the purposes of specification be taken as an example only, since mica in such comminuted condition as to be regarded as powdered will respond to treatment with binding materials of the character described. Insulating bodies having shapes or proportions other than those of relatively thin plates, are, like true plates, capable of being manufactured by association of mica fragments and inorganic binders.

What we claim and desire to secure by Letters Patent is:

1. The method of producing insulating bodies, characterized by association of mica fragments with an inorganic binding material which, at ordinary atmospheric pressure requires a temperature substantially as high as the disintegration point of mica to render it fluid, raising the associated mica fragments and binding material to a temperature below that at which mica disintegrates, and applying pressure adequate to make the binding material flow at that temperature.

2. The method of producing insulating bodies, characterized by association of mica fragments with a glass-like binding material which at ordinary atmospheric pressure requires a temperature substantially as high as the disintegration point of mica to render it fluid, raising the associated mica fragments and binding material to a temperature below that at which mica disintegrates, and applying pressure adequate to make the binding material flow at that temperature.

3. The method of producing insulating bodies, characterized by association of mica fragments with a binding material comprising a glass-like salt of an alkaline metal, which at ordinary atmospheric pressure, requires a temperature substantially as high as the disintegration point of mica to render it fluid, raising the associated mica fragments and binding material to a temperature below that at which mica disintegrates, and applying pressure adequate to make the binding material flow at that temperature.

4. The method of producing insulating bodies, characterized by association of mica fragments with a binding material comprising a glass-like salt of an alkaline metal with an admixture of relatively heat-refractory alkaline metal salt, which binding material at ordinary atmospheric pressure requires a temperature substantially as high as the disintegration point of mica to render it fluid, raising the associated mica fragments and binding material to a temperature below that at which mica disintegrates, and applying pressure adequate to make the binding material flow at that temperature.

5. The method of producing insulating bodies, characterized by association of mica fragments with, in solution, a glass-like binding material which at ordinary atmospheric pressure requires a temperature substantially as high as the disintegration point of mica to render it fluid, raising the associated mica fragments and binding material solution to a temperature below that at which mica disintegrates, permitting substantially all of the solvent vaporized by heat to escape, and subsequently applying pressure adequate to make the binding material flow at a temperature below that of mica disintegration.

6. The method of producing insulating bodies, characterized by association of mica fragments with, in solution, a binding material comprising a glass-like salt of an alkaline metal which at ordinary atmospheric pressure requires a temperature substantially as high as the disintegration point of mica to render it fluid, raising the associated mica fragments and binding material solution to a temperature below that at which mica disintegrates, permitting substantially all of the solvent vaporized by heat to escape, and subsequently applying pressure adequate to make the binding material flow at a temperature below that of mica-disintegration.

7. The method of producing insulating bodies, characterized by association of mica fragments with, in solution, a binding material comprising a glass-like salt of an alkaline metal with an admixture of relatively heat-refractory alkaline metal salts, which binding material at ordinary atmospheric pressure requires a temperature substantially as high as the disintegration point of mica to render it fluid, raising the associated mica fragments and binding material solution to a temperature below that at which mica disintegrates, permitting substantially all of the solvent vaporized by heat to escape, and subsequently applying pressure adequate to make the binding material flow at a temperature below that of mica-disintegration.

8. The method of producing insulating bodies, characterized by association of mica-fragments with a glass-like phosphate of an alkali metal, raising the associated materials to a temperature below that at which mica disintegrates, and applying pressure thereto.

9. The method of producing insulating bodies, characterized by association of mica fragments with a glass-like phosphate of an alkali metal with an admixture of other alkaline metal salt, raising the associated materials to a temperature below that at which mica disintegrates, and applying pressure thereto.

10. The method of producing insulating bodies, characterized by association of mica fragments with a glass-like phosphate of an alkali metal, in solution, raising the associated materials to a temperature below that at which mica disintegrates, allowing the solvent vaporized by heat to escape, and thereafter applying pressure to the associated materials.

11. The method of producing insulating bodies, characterized by association of mica fragments with, in solution, a glass-like phosphate of an alkali metal with an admixture of other alkaline metal salt, raising the associated materials to a temperature below that at which mica disintegrates, allowing the solvent vaporized by heat to escape, and thereafter applying pressure to the associated materials.

12. The method of producing insulating bodies, characterized by association of mica fragments with a binder comprising monobasic sodium phosphate and crystallized borax, raising the associated material to a temperature below that at which mica disintegrates, and applying pressure thereto.

13. The method of producing insulating bodies, characterized by association of mica fragments with a binder comprising a solution of monobasic sodium phosphate and crystallized borax, raising the associated materials to a temperature below that at which mica disintegrates, allowing the solvent vaporized by heat to escape, and thereafter applying pressure to the associated materials.

14. An insulating body in which are combined mica fragments and an inorganic binding material characterized by a liquefying temperature at ordinary atmospheric pressure substantially at least as high as the decomposition temperature of mica.

15. An insulating body in which are combined mica fragments and a glass-like binding material characterized by a liquefying temperature at ordinary atmospheric pressure substantially at least as high as the decomposition temperature of mica.

16. An insulating body in which are combined mica fragments and a binding material comprising a glass-like salt of an alkaline metal characterized by a liquefying temperature at ordinary atmospheric pressure substantially at least as high as the decomposition temperature of mica.

17. An insulating body in which are combined mica fragments and a binding material comprising a glass-like salt of an alkaline metal with an admixture of relatively heat-refractory alkaline-metal salt, which binding material is characterized by a liquefying temperature at ordinary atmospheric pressure substantially at least as high as the decomposition temperature of mica.

18. An insulating body in which are combined mica fragments and a binding material comprising a glass-like phosphate of an alkali metal.

19. An insulating body in which are combined mica fragments and a binding material comprising a glass-like phosphate of an alkali metal with an admixture of other alkaline metal salt.

20. An insulating body in which are combined mica fragments and a binding material comprising monobasic sodium phosphate and sodium tetraborate.

21. Composite insulating material, comprising mica flakes, bound together by films comprising alkali-metal phosphate.

22. Composite insulating material, comprising mica flakes, bound together by films comprising sodium metaphosphate.

23. The method of producing insulating bodies, characterized by association of mica fragments with an alkali-metal metaphosphate, raising the temperature of the associated materials to a degree below that at which mica disintegrates, and applying pressure to the materials adequate to make the metaphosphate flow at that temperature.

24. The method of producing insulating bodies, characterized by association of mica fragments with a binding material comprising an alkali-metal metaphosphate with an admixture of relatively heat-refractory alkali-metal salts, raising the temperature of the associated materials to a degree below that at which mica disintegrates, and applying pressure to the materials adequate to make the binding material flow at that temperature.

25. The method of producing insulating bodies, characterized by association of mica fragments with sodium metaphosphate, raising the temperature of the associated materials to a degree below that at which mica disintegrates, and applying pressure to the materials adequate to make the metaphosphate flow at that temperature.

26. The method of producing insulating bodies, characterized by association of mica fragments with a binding material comprising sodium metaphosphate, with an admixture of relatively heat-refractory alkali-metal salts, raising the temperature of the associated materials to a degree below that at which mica disintegrates, and applying pressure to the materials adequate to make the binding material flow at that temperature.

27. An insulating body, in which are combined mica fragments with an alkali-metal metaphosphate as a binder.

28. An insulating body, in which are combined mica fragments and a binding material comprising an alkali metal metaphosphate and relatively heat-refractory other alkali-metal salts.

29. An insulating body, in which are combined mica fragments with sodium metaphosphate as a binder.

30. An insulating body, in which are combined mica fragments and a binding material comprising sodium metaphosphate and relatively heat-refractory other alkali-metal salt.

31. The method of producing insulating bodies, characterized by association of mica fragments with an inorganic binding material containing water, raising the temperature of the associated materials under such conditions as to vaporize water, permitting substantially all of the water vaporized by heat to escape, and applying pressure to the associated materials.

32. The method of producing insulating bodies, characterized by association of mica fragments with a glass-like salt of an alkali metal in water solution, raising the temperature of the associated materials to a degree below the disintegration point of mica and under such conditions as to vaporize water, permitting the water vaporized by heat to escape until a residue remains so small that the salt at ordinary atmospheric pressure is practically non-fluid, and then applying pressure to the associated materials adequate to make the silicate flow.

33. The method of producing insulating bodies, characterized by association of mica fragments with a binding material comprising an alkali-metal salt in water solution with an admixture of a more heat-refractory alkali-metal salt, raising the temperature of the associated materials to a degree below the disintegration point of mica and under such conditions as to vaporize water, permitting the water vaporized by heat to escape until a residue remains so small that the binding material, at ordinary atmospheric pressure is practically non-fluid, and then applying pressure to the associated materials adequate to make the binding material flow.

Signed by us at Boston, Massachusetts, this nineteenth day of October, 1922.

CHESTER L. DAWES.
WILLIS A. BOUGHTON.